UNITED STATES PATENT OFFICE.

HANS KUŽEL, OF HÖCHST-ON-THE-MAIN, GERMANY, ASSIGNOR TO THE FARB-WERKE, VORMALS MEISTER, LUCIUS & BRÜNING, OF SAME PLACE.

AMIDO-OXYNAPHTHALINE DISULPHONIC ACID.

SPECIFICATION forming part of Letters Patent No. 458,286, dated August 25, 1891.

Application filed January 20, 1891. Serial No. 378,399. (Specimens.) Patented in Germany September 7, 1889, No. 53,023; in England September 26, 1889, No. 15,175, and in France November 5, 1889, No. 201,742.

*To all whom it may concern:*

Be it known that I, HANS KUŽEL, doctor of philosophy, a citizen of the Empire of Germany, residing at Höchst-on-the-Main, in the Empire of Germany, have invented certain new and useful Improvements in the Production of Amido Oxynaphthaline Disulphonic Acid; and I do hereby declare the following to be a full, clear, and exact description of the invention, such as will enable others skilled in the art to which it appertains to make and use the same.

This invention relates to the production of amido-oxynaphthaline disulphonic acid by heating alpha-naphthylamine trisulphonic acid with caustic alkalies, for which I have obtained patents in Germany No. 53,023, dated September 7, 1889; in England, 15,175, dated September 26, 1889, and in France, 201,742, dated November 5, 1889. In the alpha-naphthylamine trisulphonic acid which is obtained from the naphthaline trisulphonic acid of the German Letters Patent No. 38,281 by nitration and reduction may be replaced successively two sulpho groups by hydroxyl groups by melting it together with caustic alkalies. In this manner are formed in the first stage amido-oxynaphthaline disulphonates.

In carrying out my invention I proceed, for example, as follows: One hundred parts, by weight, of alpha-trisulphonate of sodium are well mixed with fifty parts, by weight, of water and two hundred parts, by weight, of caustic soda and heated to 220° to 260° centigrade. The transposition begins at 200° to 210° centigrade; but at temperatures below 230° centigrade it requires a rather long time—twelve to eighteen hours—for completion. When the temperature is raised to 240° to 260° centigrade, the melt takes a red color and begins to foam violently. A short time after, from a quarter to half an hour, the foaming ceases and the melt thickens. At this stage the conversion of the alpha-naphthylamine trisulphonic acid into amido-oxynaphthaline disulphonic acid is complete. In order to liberate this body, the melt is dissolved in water strongly acidulated with hydrochloric acid and left to crystallize. The acid sodium salt of the new compound is deposited in the form of a white micro-crystalline precipitate. The solution of the amido-oxynaphthaline sulphonate may, however, be used directly for other purposes after being freed from the sulphurous acid. The free amido-oxynaphthaline disulphonic acid, as well as its salts, are very readily soluble in water.

The acid has the formula:

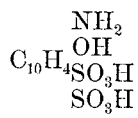

The acid sodium salt has the formula:

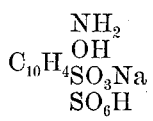

The acid and its salts in solution show a violet-blue fluorescence, which turns blue-green on the addition of an alkali. By ferric chloride is produced in a solution of the acid or its salts a dark brown coloration which is rendered more intense by an excess. A solution of chloride of lime produces a similar coloration; but on the addition of an excess it disappears completely after a short time, whereas the amido-oxynaphthaline disulphonic acids at present known are not diazotable, (Witt. B. D. D. Chem., Gesellschaft, XXI, p. 3,474.) The amido-oxynaphthaline disulphonic acid being the object of this invention is converted easily by means of nitrous acid into a diazo compound of light-yellow color and of rather difficult solubility in water. Combined with diazo compounds and tetrazo compounds in manner like, for example, naphthol disulphonic acid it furnishes in alkaline or acetic solution azo coloring-matters.

For the sodium salt may be substituted some other salt, for the caustic soda some other alkali, and instead of closed vessels open vessels may be used.

The temperature employed and the duration of the operation vary according to the larger or smaller quantity of alkali used.

What I claim as new and my invention is—

The new amido-oxynaphthaline disulphonic acid which crystallizes in long pearly needles that dry with difficulty and are derived from naphthylamine trisulphonic acid. It is slightly soluble in alcohol, ligroine, and ether, easily soluble in water with violet fluorescence,
5 turning green by the addition of alkali, turning brown by ferric chloride and bleaching-powder, but an excess of the latter decolorizes it.

In testimony whereof I affix my signature in presence of two witnesses.

HANS KUŽEL.

Witnesses:
JOSEF REVERDY,
HEINRICH HAHN.